United States Patent
Ferguson

(10) Patent No.: US 7,102,339 B1
(45) Date of Patent: Sep. 5, 2006

(54) METHOD AND APPARATUS TO SWITCH OPERATING MODES IN A PFM CONVERTER

(75) Inventor: Bruce R. Ferguson, Anaheim, CA (US)

(73) Assignee: Microsemi, Inc., Irvine, CA (US)

( * ) Notice: Subject to any disclaimer, the term of this patent is extended or adjusted under 35 U.S.C. 154(b) by 289 days.

(21) Appl. No.: 10/760,626

(22) Filed: Jan. 20, 2004

Related U.S. Application Data

(60) Provisional application No. 60/441,702, filed on Jan. 21, 2003.

(51) Int. Cl.
*G05F 1/40* (2006.01)
(52) U.S. Cl. ................................ 323/284; 323/282
(58) Field of Classification Search ............... 323/282, 323/284
See application file for complete search history.

(56) References Cited

U.S. PATENT DOCUMENTS

| | | | |
|---|---|---|---|
| 4,618,812 A | | 10/1986 | Kawakami |
| 5,350,997 A | | 9/1994 | Ghotbi et al. |
| 5,359,276 A | | 10/1994 | Mammano |
| 5,552,694 A | | 9/1996 | Appeltans |
| 5,568,044 A | * | 10/1996 | Bittner ...................... 323/272 |
| 5,736,842 A | | 4/1998 | Jovanovic |
| 5,798,635 A | | 8/1998 | Hwang et al. |
| 5,889,392 A | | 3/1999 | Moore et al. |
| 6,157,182 A | * | 12/2000 | Tanaka et al. ............... 323/284 |
| 6,163,143 A | * | 12/2000 | Shimamori ................. 323/284 |
| 6,204,650 B1 | * | 3/2001 | Shimamori ................. 323/283 |
| 6,215,288 B1 | * | 4/2001 | Ramsey et al. ............. 323/224 |
| 6,229,293 B1 | * | 5/2001 | Farrenkopf ................. 323/288 |
| 6,285,571 B1 | | 9/2001 | Brooks et al. |
| 6,292,378 B1 | | 9/2001 | Brooks |
| 6,348,779 B1 | | 2/2002 | Sluijs |
| 6,348,780 B1 | * | 2/2002 | Grant ......................... 323/222 |
| 6,351,162 B1 | | 2/2002 | Schwartz |
| 6,356,063 B1 | | 3/2002 | Brooks |
| 6,359,796 B1 | | 3/2002 | Hartular et al. |
| 6,429,632 B1 | | 8/2002 | Forbes et al. |
| 6,430,070 B1 | | 8/2002 | Shi et al. |
| 6,459,602 B1 | | 10/2002 | Lipcsei |
| 6,605,931 B1 | | 8/2003 | Brooks |
| 6,621,256 B1 | * | 9/2003 | Muratov et al. ............ 323/282 |
| 6,696,861 B1 | * | 2/2004 | Baldwin et al. .............. 326/83 |
| 6,724,174 B1 | * | 4/2004 | Esteves et al. .............. 323/224 |
| 6,791,283 B1 | | 9/2004 | Bowman et al. |
| 2001/0033503 A1 | | 10/2001 | Hamp et al. |
| 2002/0051373 A1 | | 5/2002 | Lipcsei |
| 2002/0080631 A1 | | 6/2002 | Kanouda et al. |
| 2002/0126512 A1 | | 9/2002 | Nakagawa et al. |

(Continued)

OTHER PUBLICATIONS

Bruce R. Ferguson: Copending U.S. Patent Application entitled Dual-Mode PFM Boost Converter; U.S. Appl. No. 10/761,801, filed Jan. 20, 2004 (MSEMI.085A).

*Primary Examiner*—David M. Gray
*Assistant Examiner*—Harry Behm
(74) *Attorney, Agent, or Firm*—Knobbe, Martens, Olson & Bear, LLP.

(57) ABSTRACT

A dual-mode pulse frequency modulation boost converter operates in a hysteretic mode during light load currents to regulate an output voltage using a substantially fixed peak switching current and operates in a continuous mode during heavy load currents to regulate the output voltage using a variable peak switching current. The boost converter senses load power to automatically switch between the hysteretic mode and the continuous mode.

10 Claims, 5 Drawing Sheets

U.S. PATENT DOCUMENTS

2002/0145891 A1  10/2002  Ling
2002/0154524 A1  10/2002  Yamanaka et al.
2005/0046399 A1* 3/2005  Gan et al. .................. 323/222

* cited by examiner

| FIG.2A | FIG.2B |

METHOD AND APPARATUS TO SWITCH OPERATING MODES IN A PFM CONVERTER

CLAIM FOR PRIORITY

This application claims the benefit of priority under 35 U.S.C. § 119(e) of U.S. Provisional Application No. 60/441, 702, filed on Jan. 21, 2003, and entitled DUAL-MODE PFM BOOST CONVERTER, the entirety of which is incorporated herein by reference.

BACKGROUND OF THE INVENTION

1. Field of the Invention

The present invention relates generally to power conversion circuits and more particularly to a boost converter that uses two pulse frequency modulation (PFM) operating modes for efficiency.

2. Description of the Related Art

Inductor based boost mode light emitting diode (LED) drivers typically include pulse width modulation (PWM) converters that operate at a fixed frequency. A PWM converter uses an oscillator to generate the fixed (or PWM reference) frequency and varies the switching duty cycle applied to a semiconductor switch to regulate an output voltage. The PWM converter can operate in a voltage mode or a current mode. In a current mode PWM converter, the output voltage is regulated indirectly by controlling a peak or an average switch current. In a voltage mode PWM converter, the output voltage is directly regulated. Both modes of operation can promote inefficiency (e.g., switching loss or conduction loss) as load current changes.

SUMMARY OF THE INVENTION

The present invention solves these and other problems by providing a power conversion circuit (e.g., a dual-mode PFM converter) that optimizes efficiency over a wide range of loading conditions. For example, the power conversion circuit accepts an input voltage (e.g., a first direct current voltage) at a first level and supplies an output voltage (e.g., a second direct current voltage) at a second level. The power conversion circuit includes a switching transistor to generate the output voltage. A PFM circuit controls the switching transistor. An inner control loop senses a switching current flowing through the switching transistor and generates a first feedback signal to the PFM circuit to turn off the switching transistor for a predefined duration when the switching current reaches a predetermined level. The predetermined level is substantially constant in a first mode and is controlled by an output voltage feedback signal in a second mode. An outer control loop senses a load current. The outer control loop turns the PFM circuit off when the load current is greater than a reference level during the first mode and forces the PFM circuit to stay on during the second mode.

In one embodiment, a dual-mode PFM converter (or a switching regulator) operates in a first mode (or a hysteretic mode) to regulate an output voltage using a substantially fixed peak switching current and operates in a second mode (or a continuous mode) to regulate the output voltage using a variable peak switching current. The switching regulator senses load power to switch between the hysteretic mode and the continuous mode.

For example, the switching regulator operates in the hysteretic mode for a first range of load currents (e.g., relatively light load currents). In the hysteretic mode, a pulse frequency modulator is on for a burst period when the output voltage of the switching regulator is less than a first level and off when the output voltage of the switching regulator is greater than a second level. During each burst period, the pulse frequency modulator controls switching cycles for a switch. Each switching cycle involves turning on the switch until the switch conducts the substantially fixed peak switching current and subsequently turning off the switch for a predetermined duration.

The substantially fixed peak switching current is set relatively low to accommodate the intended relatively light load currents while keeping conduction loss down. At the same time, the fixed peak switching current is sufficiently high to allow regulation of the output voltage using a small number of switching cycles (e.g., less than 16) in each burst period, which decreases switching loss. In one embodiment, the switching regulator switches from the hysteretic mode to the continuous mode when the number of switching cycles in a burst period exceeds a predetermined value (e.g., 15), indicating a change to a heavier load current.

The switching regulator operates in the continuous mode for a second range of load currents (e.g., relatively high load currents). In the continuous mode, the pulse frequency modulator is continuously on to control switching cycles for the switch. Each switching cycle involves turning on the switching until the switch conducts a variable peak switching current and subsequently turning off the switching for the predetermined duration. The variable peak switching current varies according to a feedback signal indicative of the output voltage or output current of the switching regulator. The variable peak switching current decreases as the load current decreases to decrease conduction loss. In one embodiment, the switching regulator switches from the continuous mode to the hysteretic mode when the variable peak switching current is less than a predefined level, indicating a change to a lighter load current.

In one embodiment, a dual-mode switching regulator includes a switch (or a semiconductor switch), a pulse frequency modulator (or a PFM controller), a first feedback loop, and a second feedback loop. The pulse frequency modulator controls switching cycles of the switch. The first feedback loop detects when the switch conducts a current above a selected threshold during each switching cycle and outputs a peak-current detection signal to the pulse frequency modulation in response to turn off the switch for predefined duration.

The selected threshold is a substantially fixed threshold in a first mode (or a hysteretic mode for relatively light load currents) and a variable threshold in a second mode (or a continuous mode for relatively heavy load currents). In one embodiment, the variable threshold is derived from an output (e.g., an output voltage or an output current) of the dual-mode switching regulator and is provided by the second feedback loop to the first feedback loop.

The second feedback loop monitors the output of the dual-mode switching regulator for continuous closed-loop regulation and determines whether to operate the dual-mode switching regulator in the first mode or the second mode. The second feedback loop outputs a burst control signal to turn on the pulse frequency modulator for an active period during the second mode or when the output of the dual-mode switching regulator is less than a first level during the first mode. The burst control signal turns off the pulse frequency modulator when the output is greater than a second level during the first mode.

In one embodiment, the second feedback loop monitors the peak-current detection signal to switch operation from the first mode to the second mode. For example, the second feedback loop switches the operation of the dual-mode switching regulator from the first mode to the second mode when the peak-current detection signal indicates that the number of switching cycles for the switch exceeds a predetermined value during an active period of the pulse frequency modulator. The second feedback loop monitors the variable threshold to switch operation from the second mode to the first mode. For example, the second feedback loop switches the operation of the dual-mode switching regulator from the second mode to the first mode when the variable threshold is less than a predefined level.

In one embodiment, the dual-mode switching regulator is a boost converter. For example, the boost converter includes an input inductor coupled between an input voltage and a switch, a rectifying diode coupled between the input inductor and an output of the boost converter, and a filter capacitor coupled between the output of the boost converter and ground. In one embodiment, the boost converter drives one or more light emitting diodes (LEDs).

In one embodiment, a switching converter includes a semiconductor switch, a PFM controller, a peak current detector, a feedback voltage detector, and a load sensor. The PFM controller turns the semiconductor switch on and off. The peak current detector senses current flowing through the semiconductor switch and outputs a peak current pulse to the PFM controller when the sensed current is above a reference peak level. The PFM controller turns off the semiconductor switch for a predetermined duration in response to the peak current pulse.

The feedback voltage detector senses an output voltage of the switching converter and outputs a control signal to the PFM controller. The control signal is in an active phase and turns on the PFM controller when the sensed output voltage is less than a first predefined voltage. The control signal is in an inactive phase and turns off the PFM controller when the sensed output voltage is greater than a second predefined voltage. In one embodiment, the feedback voltage detector is a first comparator with hysteresis. The sensed output voltage is provided to a negative input terminal while a first reference voltage is provided to a positive input terminal of the first comparator.

The load sensor detects load current and outputs an override control signal to force the PFM controller to remain on when the load current is greater than a predetermined level (or relatively high). When the override control signal is active, the reference peak level of the peak current detector becomes a variable peak level that varies with the sensed output voltage. In one embodiment, the variable peak level is generated by a filter circuit (or an integrator circuit) coupled to an output of the feedback voltage detector. A clamp circuit may be further included to hold the output of the filter circuit at a predetermined value when the override control signal is inactive. The reference peak level of the peak current detector is substantially constant when the override control signal is inactive.

In one embodiment, the load sensor includes a counter and a latch. The counter increments with each peak current pulse and resets when the control signal is in the inactive phase. The output of the latch is the override control signal. The latch sets when the counter overflows indicating that the load current is greater than a predetermined level and resets when the variable peak level is less than a predefined level indicating that the load current is less than the predetermined level. In another embodiment, the load sensor is a second comparator with the first reference voltage provided to a positive input terminal and a second reference voltage provided to a negative input terminal of the second comparator.

These and other objects and advantages of the present invention will become more fully apparent from the following description taken in conjunction with the accompanying drawings. For purpose of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF THE INVENTION

Figure 1:
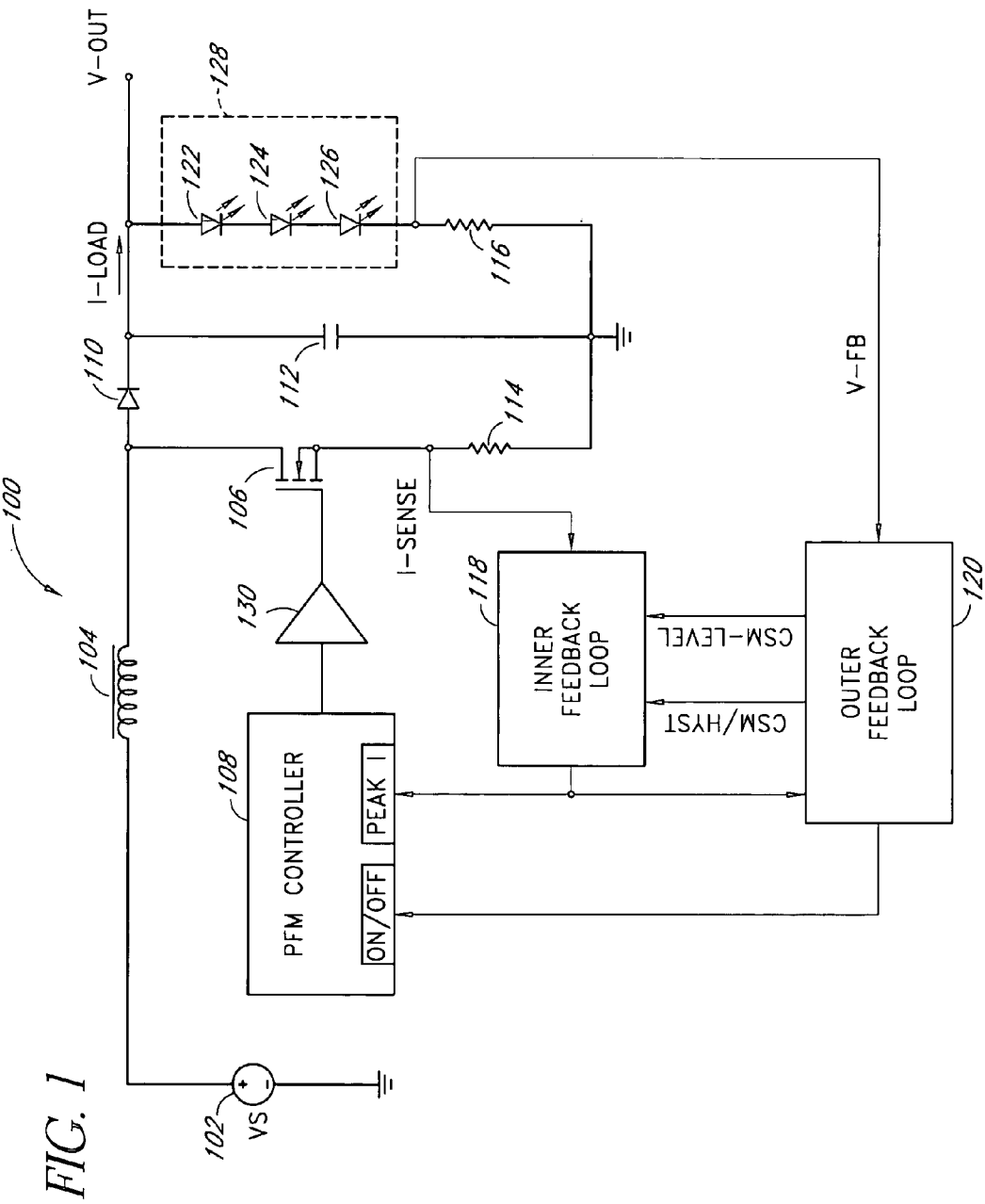
FIG. 1 is a simplified schematic diagram of one embodiment of a dual-mode boost converter in accordance with the present invention.

Embodiments of the present invention will be described hereinafter with reference to the drawings. FIG. 1 illustrates a simplified schematic diagram of one embodiment of a dual-mode boost converter 100. The dual-mode boost converter 100 accepts a direct current (DC) input voltage (VS) 102 and produces a DC output voltage (V-OUT) which can be greater than the input voltage 102. The output voltage can be used to power a load 128, e.g., three light emitting diodes (LEDs) 122, 124, 126 connected in series. The dual-mode boost converter 100 can adjust the brightness of the LEDs 122, 124, 126 by varying the power (or load current) provided to the load 128. In some applications, the load current (I-LOAD) varies over a wide range to accommodate a wide range of ambient lighting conditions.

The dual-mode boost converter 100 includes an input inductor 104, a switch 106, a rectifying diode 110, a filter capacitor 112, and sense resistors 114, 116. In one embodiment, the switch 106 is an N-type metal-oxide semiconductor field effect transistor (N-MOSFET). The input inductor 104 is coupled between the input voltage and a drain terminal of the switch 106. The first sense resistor 114 is coupled between a source terminal of the switch 106 and ground. The rectifying diode 110 has an anode coupled to the drain terminal of the switch 106 and a cathode coupled to the output voltage. The filter capacitor 112 is coupled between the output voltage and ground. The second sense resistor 116 is coupled between the load 128 and ground.

In one embodiment, the switch 106 is controlled by a PFM controller 108 which outputs a signal to a buffer (or a driver) 130 coupled to a gate terminal of the switch 106. The PFM controller 108 periodically increases current flowing through the input inductor 104 by closing (or turning on) the switch 106. The current conducted by the input inductor 104 is selectively coupled to the output voltage by the rectifying diode 110. The filter capacitor 112 reduces ripple voltage to maintain a substantially DC output voltage.

In one configuration, the PFM controller 108 has an on/off input (or a burst control input) and a peak current input (PEAK I). When the PFM controller 108 is off, the switch 106 opens (or is off). When the PFM controller 108 is on, the switch 106 goes through one or more switching cycles. In each switching cycle, the switch 106 turns on until the peak current input receives a signal indicating that the current through the switch 106 has reached a desired peak level. The switch 106 then turns off for a substantially fixed duration before starting the next switching cycle. The PFM controller 108 uses logic/timing circuits and advantageously does not use an oscillator to implement these switching cycles. The repetition rate (or the frequency) of the switching cycles depends on the desired peak level.

In one embodiment, an inner feedback loop 118 monitors the current flowing through the switch 106 and outputs a peak current detection signal to the peak current input. For example, the inner feedback loop 118 senses the voltage (I-SENSE) across the first sense resistor 114 and compares the sensed voltage with a peak current reference level to generate the peak current detection signal. In a first operating mode (or a hysteretic mode), the peak current reference level is substantially constant. In a second operating mode (or a continuous mode), the peak current reference level varies with the output voltage or the load current.

In one embodiment, an outer feedback loop 120 monitors the output voltage or the load current to provide closed-loop and continuous regulation of the output. The output feedback loop 120 can sense load power to determine the operating mode (CSM/HYST) and the variable peak current reference level (CSM-LEVEL), which are communicated to the inner feedback loop 118. The outer feedback loop 120 also provides a burst control line to the on/off input of the PFM controller 108.

For example, the outer feedback loop 120 senses a feedback voltage (V-FB) across the second sense resistor 116. The feedback voltage can be processed to generate the burst control line and the variable peak current reference level. The outer feedback loop 120 can additionally monitor the output (or the peak current detection signal) of the inner feedback loop 120 to determine the operating mode. In the hysteretic mode, the outer feedback loop 120 turns on the PFM controller 108 for a burst period when the output voltage is less than a first regulation level (or a minimum level) and turns off the PFM controller 108 when the output voltage is greater than a second regulation level (or a maximum level). In the continuous mode, the outer feedback loop 120 forces the PFM controller 108 to stay on.

The dual-mode boost converter 100 optimizes power conversion efficiency over a wide range of loading conditions by employing two operating modes. Under light and medium loading conditions (e.g., when the load current is relatively low), the dual-mode boost converter 100 operates in the hysteretic mode to reduce switching losses associated with turning the switch 106 on and off. Switching losses include energy associated with turning on the switch 106 as well as energy (simultaneous high levels of voltage and current) in the switch 106 during the on-to-off and off-to-on transitions. Switching losses are proportional to the switching frequency.

Under heavy loading conditions (e.g., when the load current is relatively high), the dual-mode boost converter 100 operates in the continuous mode to reduce conduction losses associated with current flowing through the switch 106. Conduction losses refer to the losses due to current flow in the series resistance of the switch 106, the input inductor 104, and the first sense resistor 114. Conduction losses are proportional to the square of the switch current.

Switching losses dominate under light loading conditions, and conduction losses dominate under heavy loading conditions. The dual-mode boost converter 100 uses the hysteretic mode to reduce switching losses for light/medium loads by delivering relatively more energy during the switching cycles and allowing for relatively longer periods of inactivity between each burst of switching cycles. The dual-mode boost converter 100 uses the continuous mode to reduce conduction losses for heavy loads by forcing the PFM controller 108 to remain on to facilitate more switching cycles and subsequently reducing the peak current of the switch 106. The dual-mode boost converter 100 advantageously uses PFM techniques for both operating modes, eliminating a need for an oscillator to control the switch 106.

Figures 2, 2A:
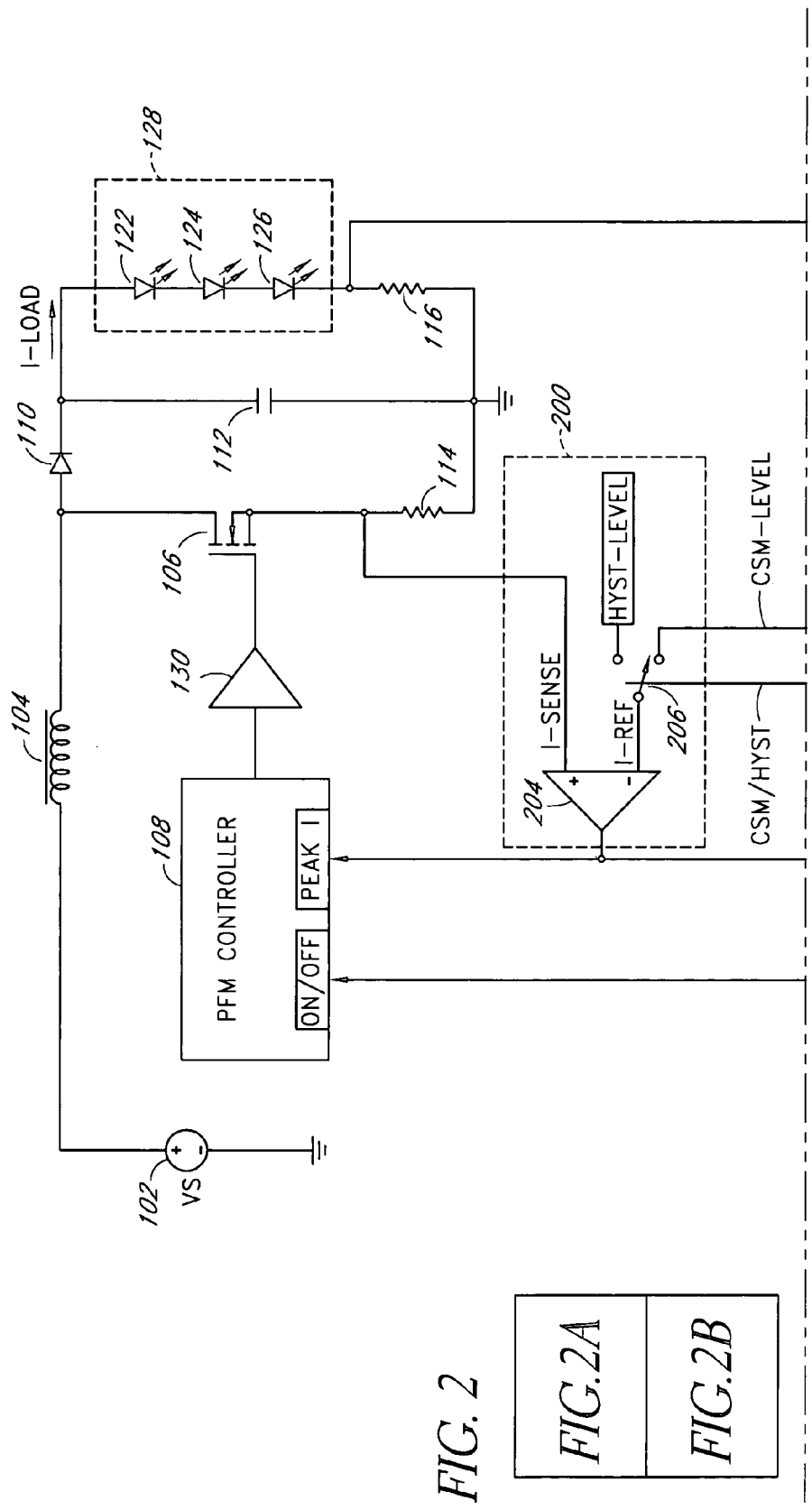
FIG. 2, comprising of FIGS. 2A and 2B, is a detailed schematic diagram of one embodiment of the dual-mode boost converter shown in FIG. 1.
Figure 2B:
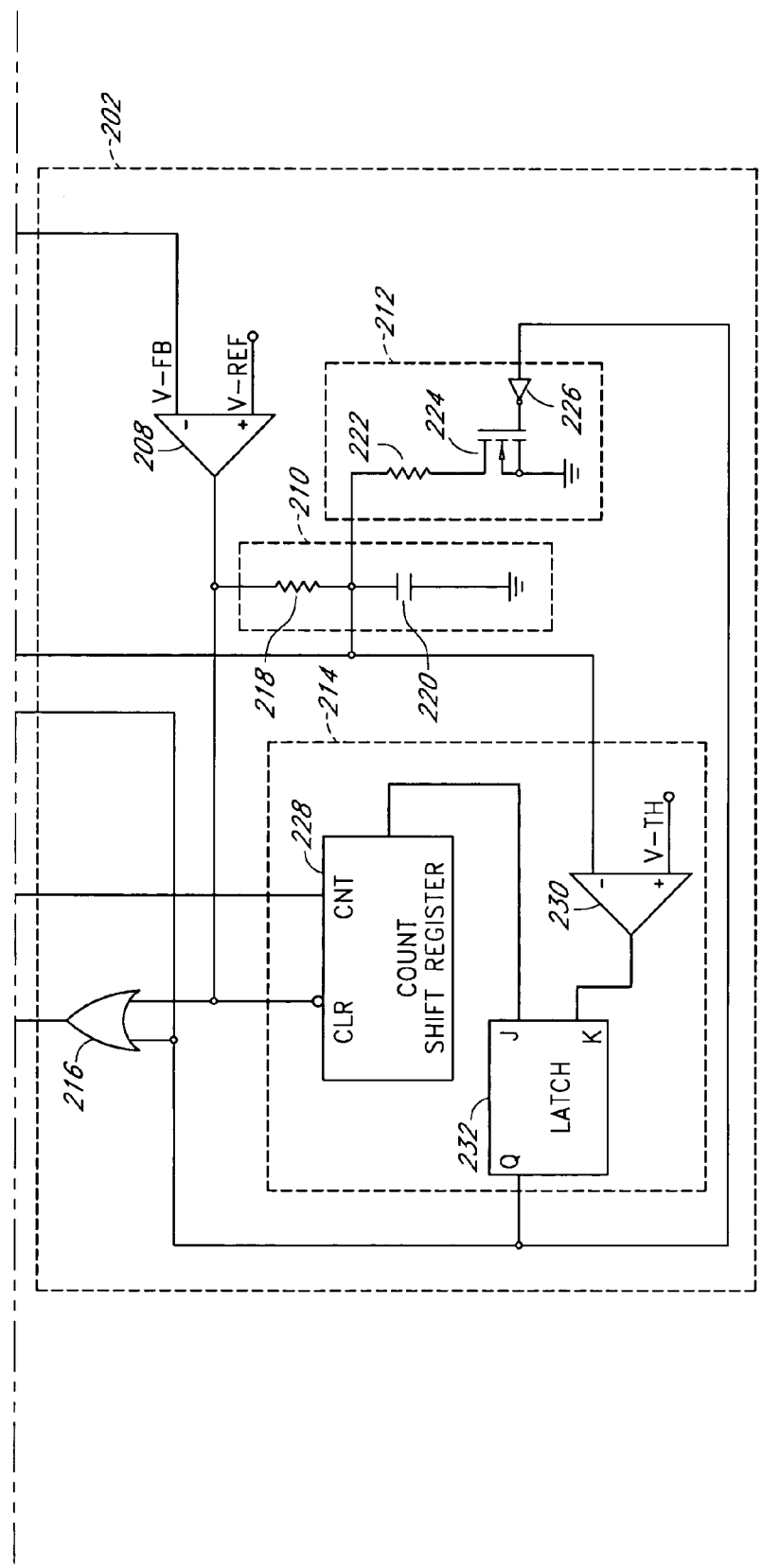

FIG. 2, comprising of FIGS. 2A and 2B, is a detailed schematic diagram illustrating one embodiment of an inner feedback loop 200 and an outer feedback loop 202. The inner feedback loop 200 includes a peak current comparator (or detector) 204 and a switch 206. The peak current comparator 204 senses current flowing through the switch 106 and outputs a peak current pulse to a first input (PEAK I) of the PFM controller 108 when the sensed current is above a reference peak level. The PFM controller 108 turns off the switch 106 for a predetermined duration in response to the peak current pulse.

In one embodiment, an output voltage (I-SENSE) across the first sense resistor 114 is provided to a positive terminal of the peak current comparator 204. The reference peak level (I-REF) is provided to a negative terminal of the peak current comparator 204. The switch 206 is coupled to the negative terminal to selectively provide a first (or a substantially constant) peak level (HYST-LEVEL) as the reference peak level during a first operating mode (or a hysteretic mode) and a variable peak level (CSM-LEVEL) as the reference peak level during a second operating mode (or a continuous mode). The variable peak level is provided by the outer feedback loop 202, which also provides a mode selector (CSM/HYST) to control the switch 206.

The outer feedback loop 202 includes a feedback voltage detector 208, a filter circuit 210, a clamp circuit 212, a logic gate 216, and a load sensor 214. The feedback voltage detector 208 accepts a feedback voltage (V-FB) for comparison with a reference voltage (V-REF) to generate a feedback control signal at its output. The filter circuit 210 is coupled to the output of the feedback voltage detector 208 and generates the variable peak level (CSM-LEVEL). In one embodiment, the filter circuit 210 includes a first resistor 218 and a capacitor 220. The first resistor 218 is coupled between the output of the feedback voltage detector 208 and an intermediate node. The capacitor 220 is coupled between the intermediate node and ground. The voltage at the intermediate node is the variable peak level.

The clamp circuit 212 is coupled to the filter circuit 210 and clamps the variable peak level to a predetermined level in response to the mode selector indicating operation in the hysteretic mode. In one embodiment, the clamp circuit 212 includes a second resistor 222, a N-MOS switch 224, and a logic inverter 226. The second resistor 222 is coupled between the intermediate node and a drain terminal of the N-MOS switch 224. The N-MOS switch 224 has a source terminal coupled to ground and a gate terminal controlled by an output of the logic inverter 226. An input of the logic inverter 226 is coupled to the output of the load sensor 214.

The load sensor 214 generates the mode selector. The load sensor 214 monitors both the feedback control signal and the peak current pulse to switch the mode selector from the hysteretic mode to the continuous mode. The load sensor 214 monitors the variable peak level to switch from the continuous mode to the hysteretic mode. The logic gate 216 is coupled to the output of the feedback voltage detector 208 and the output of the load sensor 214 to generate a burst control signal to an on/off input of the PFM controller 108. In one embodiment, the logic gate 216 is an OR-gate. In the hysteretic mode in which the output of load sensor is low, the burst control signal is determined by the output of the feedback voltage detector 208. In the continuous mode, the burst control signal is determined by the load sensor 214 which outputs logic high to override any output from the feedback voltage detector 208.

The burst control signal is in an active phase and turns on the PFM controller 108 when a sensed output voltage is less than a first predefined voltage or when the load sensor indicates operation in the continuous mode. The burst control signal is in an inactive phase and turns off the PFM controller 108 when the sensed output voltage is greater than a second predefined voltage during the hysteretic mode. In one embodiment, the feedback voltage detector 208 uses a comparator with hysteresis to process the sensed output voltage. For example, a feedback voltage (V-FB) across the second sense resistor 116 is provided to a negative input terminal of the feedback voltage detector (or the comparator) 208 while a reference voltage (V-REF) is provided to a positive input terminal of the comparator 208. The comparator 208 outputs a logic high when the feedback voltage is less than the reference voltage by a first amount and outputs a logic low when the feedback voltage is greater than the reference voltage by a second amount.

In the embodiment illustrated in FIG. 2, the level of the reference voltage is adjustable by a user to provide dimming control of the LEDs 122, 124, 126. For example, the reference voltage regulates the voltage across the second sense resistor 116 which in turn determines the current through the second sense resistor 116 and thereby determine the current conducted by the series-connected LEDs 122, 124, 126. Since the brightness of the LEDs 122, 124, 126 is proportional to their current, varying the first reference voltage varies the brightness of the LEDs 122, 124, 126.

The load sensor 214 indirectly detects load current by monitoring various internal signals within the feedback loop. When the load sensor 214 determines that the load current is relatively heavy, the load sensor 214 outputs logic high to configure the switching regulator for operation in the continuous mode. For example, the logic high at the output of the load sensor 214 overrides the feedback control signal from the feedback voltage detector 208 and forces the PFM controller to remain on. The logic high at the output of the load sensor 214 also causes the reference peak level (I-REF) of the peak current detector 204 to use a variable peak level that varies with the feedback voltage.

In one embodiment, the load sensor 214 includes a counter (or a shift register) 228, a latch 232, and a mode comparator 230. The peak current pulse is provided to a count input (CNT) of the counter 228, and the feedback control signal is provided to a clear input (CLR) of the counter 228. An overflow output of the counter 228 is provided to a set input (J) of the latch 232. The mode comparator 230 has a positive input terminal coupled to a threshold voltage (V-TH), a negative input terminal coupled to the variable peak level, and an output terminal coupled to a reset input (K) of the latch 232. An output (Q) of the latch 232 is the output of the load sensor 214.

The counter 228 increments with each peak current pulse and resets when the feedback control signal is logic low. The latch 232 sets when the counter 228 overflows indicating that the load current is greater than a predetermined level. Then latch resets when the variable peak level is less than the threshold voltage indicating that the load current is less than the predetermined level.

In one embodiment, the switching regulator illustrated in FIG. 2 is used as a LED driver to provide power to a plurality of LEDs 122, 124, 126. The load current varies over a wide range to provide dimming or brightness control of the LEDs 122, 124, 126. The switching regulator operates in the hysteretic mode for a first range of load currents (or light load currents). In the hysteretic mode, the switch 106 is configured to conduct a peak current that is higher than the first range of load currents to deliver relatively more power in each switching cycle, thereby reducing the number of switching cycles before the output voltage reaches an upper regulation level. For example, the reference peak level for the peak current comparator 204 is set to a relatively high hysteretic level (HYST-LEVEL) during the hysteretic mode. In other words, the ratio of the reference peak level to the load current is relatively high in the hysteretic mode. Overall, the hysteretic level is relatively low since the first range of load currents is relatively low.

When the number of switching cycles reach a predetermined value (or a maximum count), the switching regulator begins operating in the continuous mode or continuous switching mode (CSM). For example, the counter 228 keeps track of the number of consecutive switching cycles using the output of the peak current comparator 204. When the counter 228 reaches the predetermined value (e.g., 15 counts), the counter 228 sets the output of the latch 232 to force the PFM controller to stay on for the continuous mode and toggles the reference peak level to a variable continuous level (CSM-LEVEL). The maximum count sets the transition point from hysteretic to continuous mode.

The switching regulator operates in the continuous mode for a second range of load currents which are relatively higher than the first range of load currents. In the continuous mode, the ratio of the reference peak level to the load current is relatively low. The switch 106 goes through more than the predetermined number of switching cycles before the output voltage reaches the upper regulation level. The reference peak level varies with the load current during the continuous mode. That is, the reference peak level decreases as the load current decreases to reduce inefficiency associated with conduction loss. In the application illustrated in FIG. 2, the load current is sensed by monitoring the voltage across the second sense resistor 116 using the feedback voltage detector 208. In other applications, the output voltage can be monitored (e.g., by a resistor divider) to vary the reference peak level.

When the reference peak level falls below a predefined level, such as half of the hysteretic level, the switching regulator reverts to operating in the hysteretic mode. For example, the threshold voltage (V-TH) of the mode comparator 230 can be set to about half the hysteretic level. The mode comparator 230 compares the variable continuous level with the threshold voltage and resets the latch 232 when the variable continuous level falls below the threshold voltage. The threshold voltage, similar to the maximum count discussed above, can be user defined and is an arbitrary level. The threshold voltage sets the transition point from continuous to hysteretic mode.

Figure 3A:
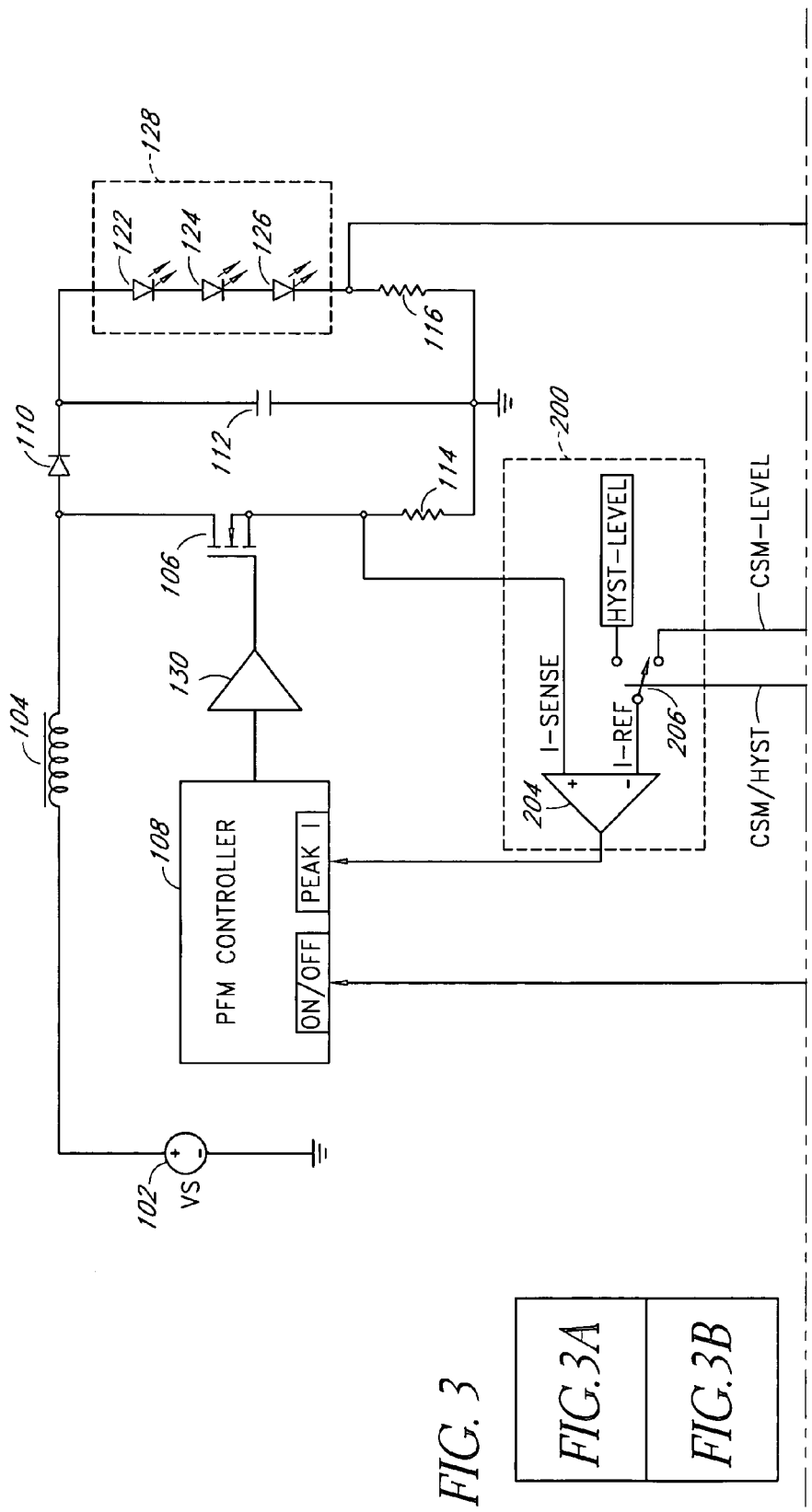
FIG. 3, comprising of FIGS. 3A and 3B, is a detailed schematic diagram of another embodiment of the dual-mode boost converter shown in FIG. 1.
Figure 3:
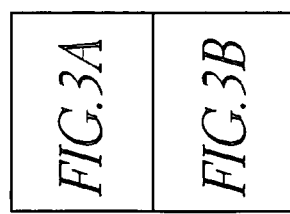
Figure 3B:
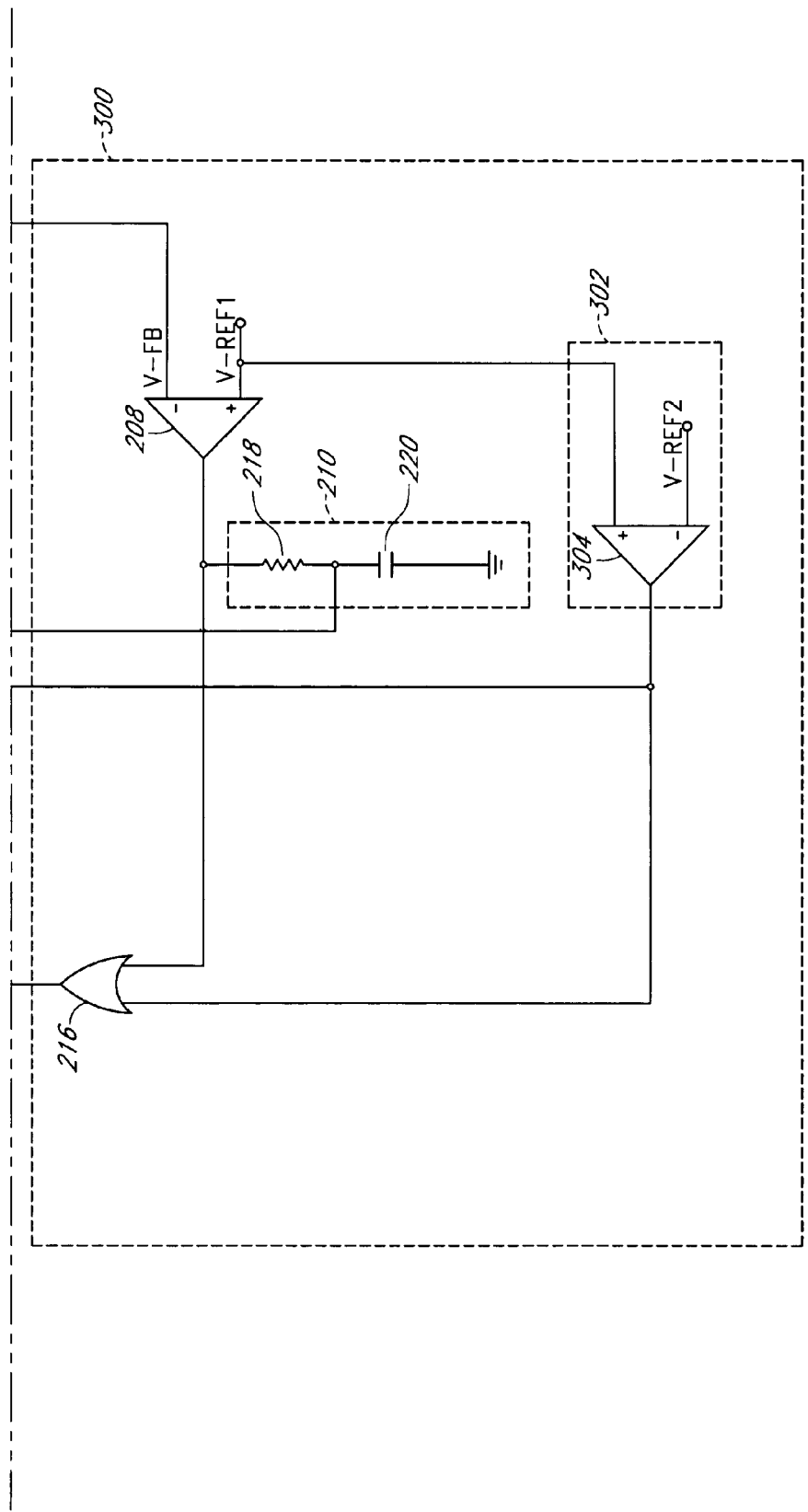

FIG. 3, comprising of FIGS. 3A and 3B, is a detailed schematic diagram of another embodiment of an outer feedback loop 300. The outer feedback loop 300 includes a feedback voltage detector (or comparator) 208, an integrator (or filter) circuit 210, a load detector 302, and a logic gate 216. The feedback voltage comparator 208 accepts a feedback voltage (V-FB) indicative of a load current and a first reference voltage (V-REF1) indicative of a desired load current. An output of the feedback voltage comparator 208 transitions from a logic high to a logic low when the feedback voltage exceeds the first reference voltage by a predefined amount and transitions from a logic low to a logic high when the feedback voltage is less than the first reference voltage by the predefined amount.

The integrator circuit 210 is coupled to the output of the feedback voltage comparator 208 to generate a continuous-mode reference level (CSM-LEVEL) for an inner feedback loop 200 discussed above. In one embodiment, the integrator circuit 210 comprises a resistor 218 and a capacitor 220. The resistor 218 is coupled between the output of the feedback voltage comparator 208 and a common node. The capacitor 220 is coupled between the common node and ground. The voltage at the common node is the continuous-mode reference level.

In one embodiment, the load detector 302 includes a comparator 304. The first reference voltage indicative of the desired load current is provided to a positive terminal of the comparator 304 and a second reference voltage (V-REF2) is provided to a negative terminal of the comparator 304. The level of the first reference voltage can be adjusted by a user. In one embodiment, the level of the first reference voltage regulates the voltage across the second sense resistor 116 which in turn determines the current through the second sense resistor 116 and thereby regulate the load current of the series-connected LEDs 122, 124, 126. Since the brightness of the LEDs 122, 124, 126 is proportional to the load current, adjusting the first reference voltage provides dimming control. In one embodiment, the second reference voltage is substantially constant and corresponds to a transition point (e.g., 10 mA) in a range of load currents for changing operating modes.

An output of the comparator 304 is a mode selection signal. The mode selection signal is logic high to configure the switching regulator for a continuous operating mode when the first reference voltage is greater than the second reference voltage to indicate desire for relatively heavy load current. The mode selection signal is logic low to configure the switching regulator for a hysteretic operating mode when the first reference voltage is less than the second reference voltage to indicate desire for relatively light load current. The mode selection signal is provided to the inner feedback loop.

The load detector 302 simplifies and provides direct control of the operating modes depending on the desired load current or the expected output power level. The comparison between the first reference voltage and the second reference voltage can be done digitally if the first reference voltage is generated by a digital-to-analog converter (DAC). For example, the continuous operating mode can be invoked if an input to the DAC is above a predetermined binary value. Similarly, the hysteretic operating mode can be invoked if the input to the DAC is less than or equal to the predetermined binary value.

The logic gate 216 accepts the output of the feedback voltage comparator 208 and the mode selection signal to generate a burst control (or on/off) signal for the PFM controller 108. In one embodiment, the logic gate 216 is a dual-input OR-gate.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A power converter comprising:
a switching transistor;
a pulse frequency modulator configured to control the switching transistor, wherein the pulse frequency modulator is enabled during a burst period in which an output of the power converter is less than a predetermined level;
a peak current detector configured to sense current through the switching transistor and to output a peak current pulse to the pulse frequency modulator to turn off the switching transistor when the sensed current exceeds a peak reference level, wherein the peak reference level is substantially constant during a hysteretic mode and is variable during a continuous switching mode; and
a load sensor configured to monitor the output of the peak current detector to change operating modes for the power converter, wherein the power converter changes from the hysteretic mode to the continuous switching mode when the number of peak current pulses in the burst period exceeds a predetermined number.

2. The power converter of claim 1 further comprising:
a feedback comparator configured to monitor the output of the power converter; and
a filter circuit coupled to an output of the feedback comparator and configured to generate a variable voltage, wherein the variable voltage is used by the peak current detector as the peak reference level when the power converter is operating in the continuous switching mode and the power converter changes from the continuous switching mode to the hysteretic mode when the variable voltage falls below a predefined threshold.

3. The power converter of claim 1, wherein the load sensor is a counter that increments with each peak current pulse and resets at the end of each burst period.

4. The power converter of claim 2, wherein the filter circuit is an integrator and the variable voltage is proportional to the duty cycle of the output of the feedback comparator.

5. A method to convert operating modes in a switching regulator, the method comprising the steps of:
turning on a pulse frequency modulator for a burst period when an output of the switching regulator is less than a first level, wherein one or more switching cycles for a switch occur in the burst period;
providing an output from the pulse frequency modulator to turn on the switch in each switching cycle until the switch conducts a peak current followed by a switch off-time of a predetermined duration, wherein the pulse frequency modulator uses a substantially constant threshold to detect the peak current during a hysteretic mode and a variable threshold to detect the peak current during a continuous mode; and converting from the hysteretic mode to the continuous mode when the number of switching cycles in a burst period exceeds a predetermined value.

6. The method of claim 5 further comprising the step of converting from the continuous mode to the hysteretic mode when the variable threshold is less than a pre-defined level.

7. The method of claim 6, wherein the variable threshold is generated from a feedback voltage indicative of the output of the switching regulator.

8. The method of claim 5, wherein the switching regulator is a boost converter.

9. A switching regulator using a dual-mode pulse frequency modulation technique comprising:

means for sensing a transition from relatively light load current to relatively heavy load current by monitoring switching cycles of a switch;

means for operating the switching regulator in a hysteretic mode during relatively light load current, wherein a pulse frequency modulator uses a first threshold to monitor current conducted by the switch during the hysteretic mode and the switch conducts a substantially fixed peak current during the hysteretic mode; and means for operating the switching regulator in a continuous switching mode during relatively heavy load current, wherein the pulse frequency modulator uses a second threshold to monitor current conducted by the switch during the continuous switching mode and the switch conducts a variable peak current during the continuous switching mode.

10. The switching regulator of claim 9, further comprising:

means for sensing an output of the switching regulator;

means for generating a feedback voltage by comparing the sensed output to a reference voltage; and means for controlling the variable peak current based on the feedback voltage.

* * * * *